United States Patent [19]

Matsushita

[11] Patent Number: 5,157,294
[45] Date of Patent: Oct. 20, 1992

[54] MINIATURE MOTOR
[75] Inventor: Ikuo Matsushita, Matsudo, Japan
[73] Assignee: Mabuchi Motor Co., Ltd., Chiba, Japan
[21] Appl. No.: 736,289
[22] Filed: Jul. 19, 1991
[30] Foreign Application Priority Data
  Jul. 23, 1990 [JP] Japan ............... 2-78039[U]
[51] Int. Cl.⁵ .................. H02K 11/00; H02K 5/24
[52] U.S. Cl. ................. 310/72; 310/40 MM; 310/51; 310/68 R
[58] Field of Search ......... 310/72, 51, 90, 154, 310/68 R, 40 MM, 216, 196, 220, 221, 68 E; 361/15, 33

[56] References Cited
U.S. PATENT DOCUMENTS

| | | | |
|---|---|---|---|
| 3,924,148 | 12/1975 | Tachibana et al. | 310/220 |
| 4,562,395 | 12/1985 | Riib et al. | 318/696 |
| 4,577,610 | 3/1986 | Schmatz | 123/633 |
| 4,734,601 | 3/1988 | Lewus | 310/68 R |
| 4,853,569 | 8/1989 | Lewus | 310/68 E |

FOREIGN PATENT DOCUMENTS
60-29343 9/1985 Japan.
3-23825 5/1991 Japan.

Primary Examiner—Steven L. Stephan
Assistant Examiner—E. H. To
Attorney, Agent, or Firm—McGlew & Tuttle

[57] ABSTRACT

A miniature motor driven by a full-wave or half-wave rectified power source, having a stator of a two-pole field system using a permanent magnet as magnetic poles, a rotor comprising a winding wound on a four-pole core, and noise-suppressing capacitors disposed between adjoining core arms of the four-pole core of the rotor.

5 Claims, 10 Drawing Sheets (1A)

(1B)

(2A)

(2B)

(3A)

(3B)

(4A)

(4B)

FIG. 2 (II)
(1A)
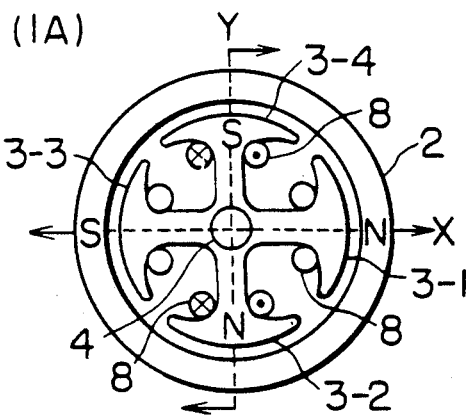
(1B)
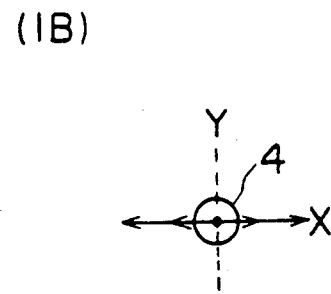
(2A)
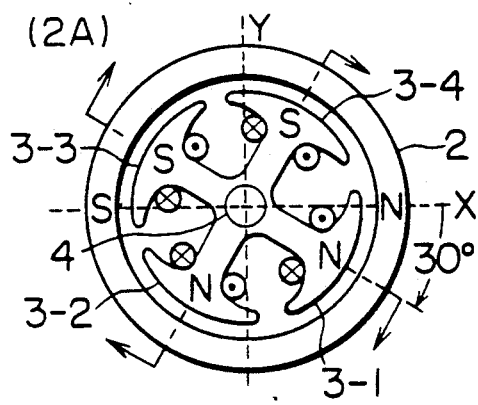
(2B)
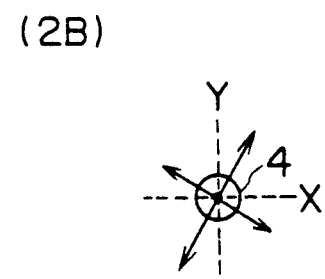
(3A)
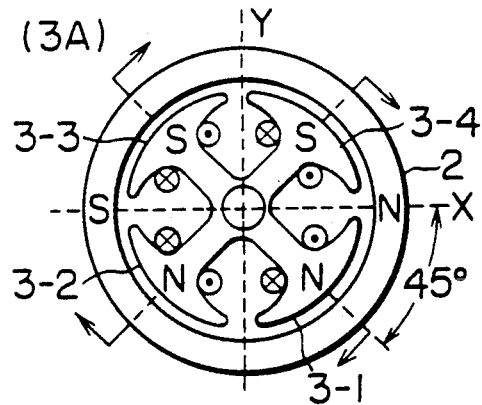
(3B)
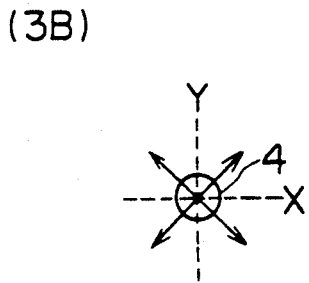
(4A)
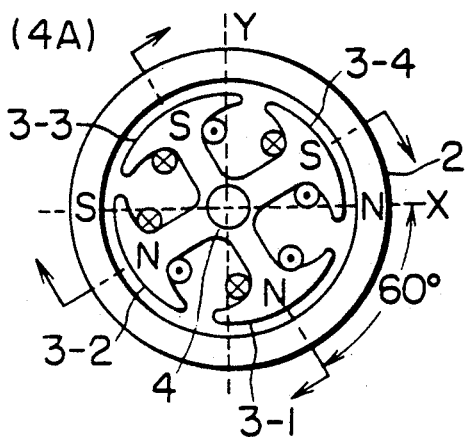
(4B)
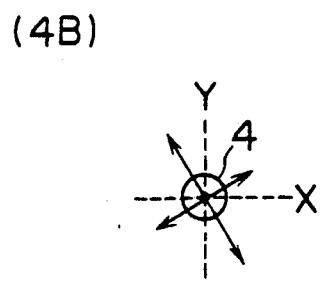

(1A)  (1B)

(2A)  (2B)

(3A)  (3B)

(4A)  (4B)

FIG. 6 (II)
(PRIOR ART)
(1A) 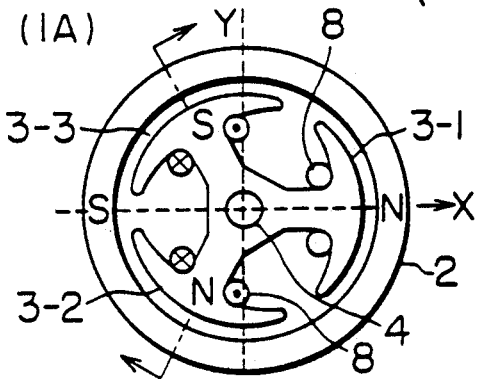
(1B) 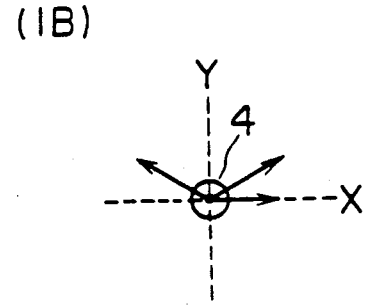
(2A) 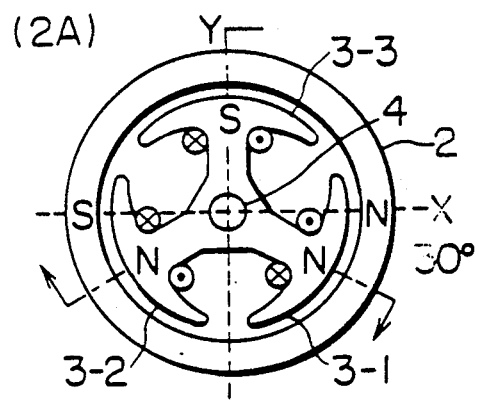
(2B) 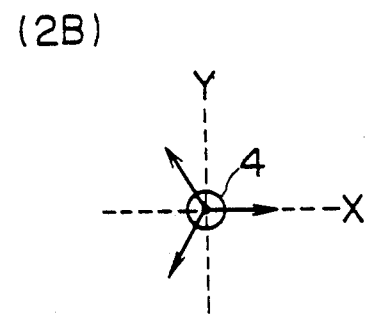
(3A) 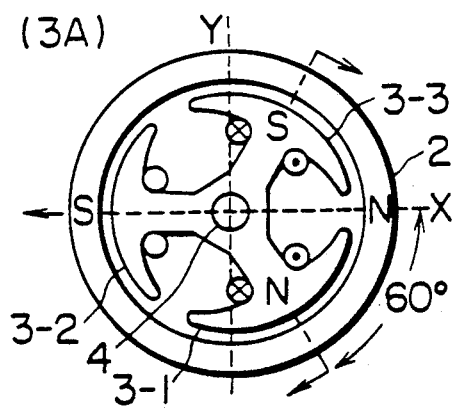
(3B) 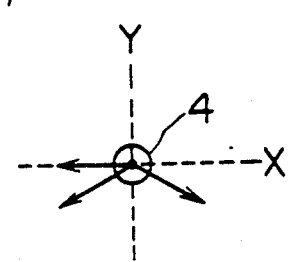
(4A) 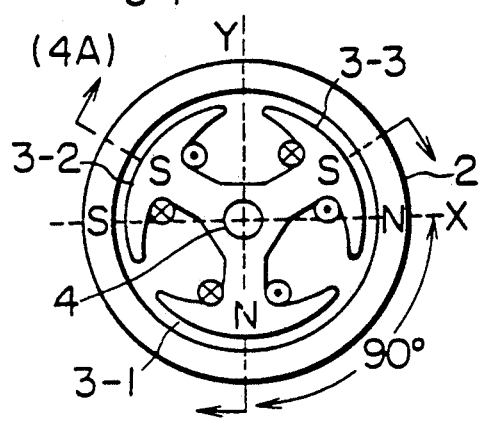
(4B) 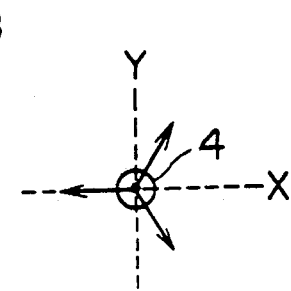

MINIATURE MOTOR

BACKGROUND OF THE INVENTION

1. Field of the Invention

This invention relates generally to a miniature motor, and more particularly to a miniature motor driven by a full-wave or half-wave rectified power source and using permanent magnets as magnetic poles. In the invention, noise-suppressing capacitors are mounted on the rotor side, and a provision is made to minimize the unwanted shaft wobbling of the motor shaft.

2. Description of the Prior Art

In general, a miniature motor has a stator having a pair of permanent magnets and a rotor having a rotor winding (not shown) wound on a three-pole rotor core, as shown in FIG. 5. FIG. 5 is a cross-sectional view of a miniature motor of a conventional type. In FIG. 5 reference numeral 1 denotes a motor case; 2 a permanent magnet; 3 a rotor core; 3-1 through 3-3 core arms; 4 a motor shaft; 6 a magnet stopper; and 7 a magnet retaining spring, respectively.

The prior-art miniature motor shown in FIG. 5 has a rotor core 3 of a three-pole construction. The outer circumferential surface each of the core arms 3-1 through 3-3 of the rotor core 3 is formed into a substantially circular arc shape so that the gap between the core arm circumferential surface and the permanent magnets 2 is kept almost uniform. Both ends of a motor shaft 4 are supported by bearings (not shown). By allowing electric current to flow in the rotor winding (not shown) wound on each of the core arms 3-1 through 3-3, the rotor core 3 placed in a field formed by the permanent magnets 2 is caused to rotate.

In the miniature motor of the conventional type shown in FIG. 5, a magnetic attraction force is exercised between the permanent magnets 2 and the rotor core 3. With the rotor core having a three-pole construction, however, the attraction force tends to be asymmetrical with respect to the motor shaft 4. As a result, the balance of the magnetic attraction force generated between the permanent magnets 2 and the rotor core 3 is disturbed, with the result that the wobbling of the rotating motor shaft in the bearings is increased, leading to increased wobbling noise. In the following, the prior art will be described, referring to FIGS. 6 (I) and (II) through FIG. 8.

FIG. 6 is a diagram of assistance in explaining the magnetic attraction force produced between the permanent magnets and the rotor core in the prior art shown in FIG. 5. FIG. 6 (I) shows the case where voltage is zero for a motor that is caused to rotate by applying half-wave rectified voltage (hereinafter referred to as the case where half-wave rectified voltage is OFF). FIG. 6 (II) shows the case where a voltage is applied to the motor in a half-wave rectified voltage state (hereinafter referred to as the case where half-wave rectified wave is ON). FIGS. 7 (A) and (B) are photos of oscilloscope waveforms representing vibration measurements, and FIG. 8 is a diagram of assistance in explaining vibration measuring tests. Although the permanent magnet 2 in FIGS. 6 (I) and (II) is of a ring shape, the same effects can be achieved with arc-shaped permanent magnets as shown in FIG. 5.

In FIG. 6 (I), (1A) through (4A) represent the states of the rotor core 3 at each 30 degree angular position as the rotor core 3 is caused to rotate 90 degrees. FIG. 6(I) (1B) and (4B) show the forces exerted on the motor shaft 4 at each of these angular position (hereinafter referred to as the shaft radial forces. The sizes of the arrows, however, indicate the magnitudes of the forces only schematically.). In FIG. 6 (I) where no electric current is fed to the rotor winding 8, the force exerting on the shaft (the shaft radial force) can be considered attributable to the attraction force by the permanent magnet 2 to the motor core arms, if residual magnetism in the core arms 3-1 through 3-3 of the rotor core 3 is neglected. The shaft radial forces at the angular position shown in (1A) are balanced in both the X and Y directions, as shown in (1B). The shaft radial forces at the angular position shown in (2A), in which the rotor core 3 is turned 30 degrees from the position shown in (1A), are balanced in the X direction, but not in the Y direction, as shown in (2B). The shaft radial forces at the angular position shown in (3A), in which the rotor core 3 is further turned 30 degrees, are balanced in both the X and Y directions, as shown in (3B). Furthermore, the shaft radial forces at the angular position shown in (4A), in which the rotor core 3 is further turned 30 degrees, are balanced in the X direction, but not in the Y direction, as shown in (4B). In the foregoing, changes in shaft radial forces as the rotor core 3 is turned 90 degrees have been described. The changes in shaft radial forces at other angular positions are the repetition of the states shown in (1B) through (4B) above. That is, every time the rotor core 3 is turned 30 degrees, the imbalance of the shaft radial forces takes place, and the wobbling of the rotating motor shaft 4 is increased, leading to wobbling noise.

FIG. 6 (II), (1A) through (4A) represent the states of the rotor core 3 at each 30-degree angular position during the period in which the rotor core 3 is turned 90 degrees, while (1B) through (4B) show the shaft radial forces at each angular position. FIG. 6 (II) shows the state where half-wave rectified voltage is ON. As is well known, the current is fed to the rotor winding 8 via the brushes (not shown) and the commutator. Consequently, the manner in which current is fed to the rotor winding 8 changes in accordance with the changes in angular position of the rotor core 3, as shown in (1A) through (4A) in FIG. 6 (II). Since the core arms 3-1 through 3-3 are magnetized by the electric current flowing the rotor winding 8, the shaft radial forces rely on the relative attraction or repulsion force between the permanent magnet 2 and core arms 3-1 through 3-3.

In FIG. 6 (II), the shaft radial forces at the angular position shown in (1A) are unbalanced, as shown in (1B). The shaft radial force at the angular position shown in (2A), in which the rotor core 3 is turned 30 degrees from the state shown in (1A) are as shown in (2B). The shaft radial forces at the angular position shown in (3A), in which the rotor core 3 is further turned 30 degrees, are unbalanced, as shown in (3B). The shaft radial forces at the angular position shown in (4A), in which the rotor core 3 is still further turned 30 degrees, are as shown in (4B). In the foregoing, changes in shaft radial forces as the rotor core 3 is turned 90 degrees have been described. Shaft radial forces at other angular positions are the repetition of the states shown in (1B) through (4B). That is, the imbalance of shaft radial forces occurs every time the rotor core 3 is turned 30 degrees, and the wobbling of the rotating motor shaft 4 is increased, resulting in wobbling noise. Changes in shaft radial forces are similar in the case where a full-wave rectified voltage is fed to the rotor winding 8.

In the foregoing, the mechanism of the generation of unbalanced shaft radial forces that is responsible for wobbling noise in the prior-art miniature motor having a three-pole rotor core has been described. FIGS. 7 (A) and (B) show the results of vibration measurements in the prior-art miniature motor, which were obtained with the test setup shown in FIG. 8. The test setup was such that a miniature motor 10 was mounted on a resonator box 12 rested on a cushioning member 11, such as a sponge. The vibration waveforms of the miniature motor 10 were measured on an oscilloscope 14 via a vibration pickup 13 mounted on the resonator box 12. Test conditions were such that a fan 15 was used as a load to the miniature motor 10, and the revolution of the motor was 10,000 rpm.

FIGS. 7 (A) and (B) are photos of oscilloscope waveforms representing vibration measurements measured on a prior-art miniature motor (as shown in FIG. 5) under the above test conditions. FIG. 7 (A) shows the measurements in the case where source voltage is a half-wave rectified voltage, while FIG. 7 (B) shows those in the case where source voltage is a full-wave rectified voltage. In both figures, the waveform shown in the upper part of the figure is the measured vibration waveform, and that shown in the lower part is the source voltage waveform fed to the motor. Parallel dot lines in FIGS. 7 (A) and (B) indicate the maximum and minimum values of the oscilloscope waveforms. As is apparent from FIGS. 7 (A) and (B), the vibration (imbalance of shaft radial forces) responsible for wobbling noise in prior-art miniature motors is considerably large, particularly with half-wave rectified source voltage (FIG. 7 (A)). With the half-wave rectified source voltage involving repeated on-off cycles, the rotor core 3 is heavily excited under the influence of rush current. This leads to much higher wobbling noise than with the full-wave rectified source voltage. As is evident from FIGS. 7 (A) and (B), the peak values of vibration appear corresponding to the cycles of the source voltage.

To solve the above-mentioned problem, various means have been considered, including controlling of the type and volume of lubricant in the bearings, and adjusting the clearance between the motor shaft and the bearings. As noted earlier, the intense wobbling of the rotating motor shaft tends to accelerate the wear of the bearings, and increase the clearance between the motor shaft and the bearings, leading to increased wobbling noise. In other cases, this results in burn-out and sticking between the motor shaft and the bearings.

To solve the aforementioned problems, the present Applicant had proposed a miniature motor in a previous Utility Model Application No. 94445/1987 shown in FIG. 9. The previous proposal shown in FIG. 9 was intended to prevent wobbling noise from generating in the bearings by providing core cut portions 3-1' through 3-3' formed by cutting the outer circumferential surfaces of the core arms 3-1 through 3-3 in a three-pole rotor core 3, and making the gap over a predetermined range at the central part of the outer circumferential surface of the rotor core 3 facing the permanent magnet 2 larger than the gap over other ranges to maintain the balance of magnetic attraction force generated between the permanent magnet 2 and the rotor core 3 over the entire circumference of the rotating rotor core 3, thereby preventing the unwanted wobbling of the motor shaft during motor rotation. Photos of oscilloscope waveforms representing the results of vibration measurement tests conducted with a test setup similar to that shown in FIG. 8 are shown in FIGS. 10 (A) and (B). According to the test results, it cannot necessarily be said that the previous proposal yields satisfactory effects. FIG. 10 (A) represents the case in which source voltage was a half-wave rectified voltage, while FIG. 10 (B) represents the case in which source voltage was a full-wave rectified voltage.

Furthermore, the present Inventor conducted tests by controlling the phase angle of the brushes, but was not able to achieve the desired effects. FIGS. 11 (A) and (B) are photos of oscilloscope waveforms representing the results of vibration measurement tests conducted with a test setup similar to that shown in FIG. 8. FIG. 11 (A) represents the case where the phase angle of the brushes was controlled at a lead angle of 15 degrees, while FIG. 11 (B) represents the case where the phase angle was controlled at a lag angle of 15 degrees.

In addition, the installation of noise-suppressing capacitors poses a problem in reducing the size of miniature motors since incorporating noise-suppressing capacitors in a miniature motor would increase the size of the motor.

SUMMARY AND OBJECT OF THE INVENTION

It is an object of this invention to provide a miniature motor that is reduced in size by installing noise-suppressing capacitors on the side of the rotor.

It is another object of this invention to provide a rotor that can reduce the unwanted wobbling of the motor shaft attributable to the construction of the rotor.

It is still another object of this invention to provide a good bearing.

DETAILED DESCRIPTION OF PREFERRED EMBODIMENTS

Figure 1:
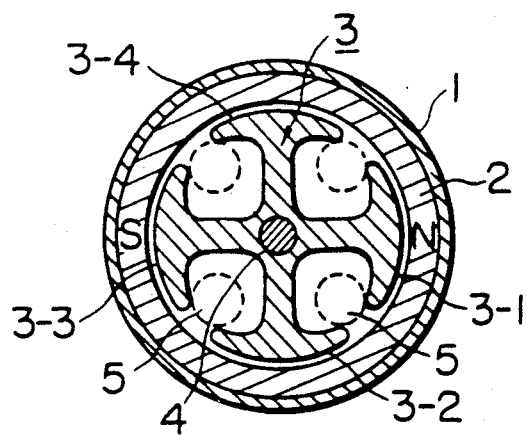
FIG. 1 is a cross-sectional view of the essential part of an embodiment of this invention.

In FIG. 1, numeral 1 refers to a motor case; 2 to a permanent magnet; 3 to a rotor core; 3-1 through 3-4 to core arms; 4 to a motor shaft; and 5 to a noise-suppressing capacitor, respectively. A rotor winding wound on the core arms 3-1 through 3-4 is omitted in the figure.

Figure 12:
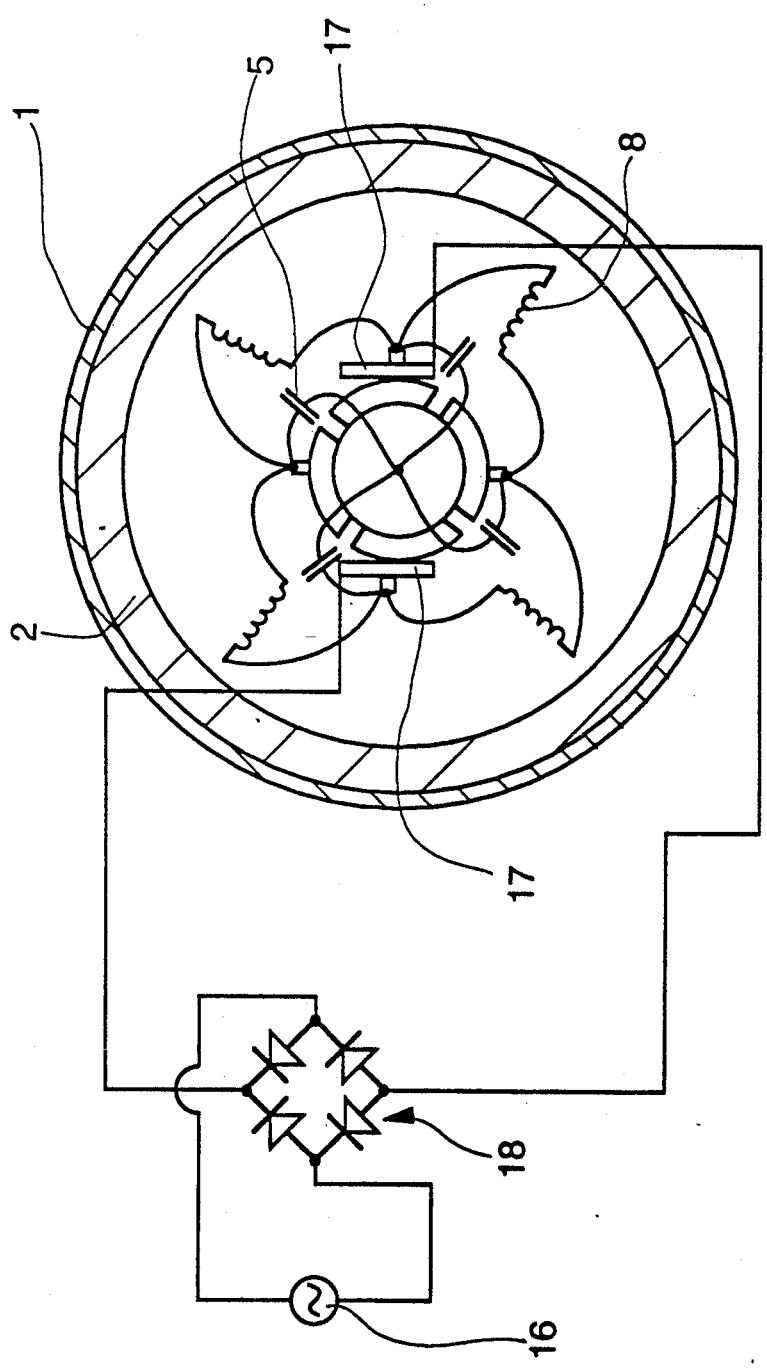
FIG. 12 is an electrical diagram showing the motor of the present invention.
Figure 13:
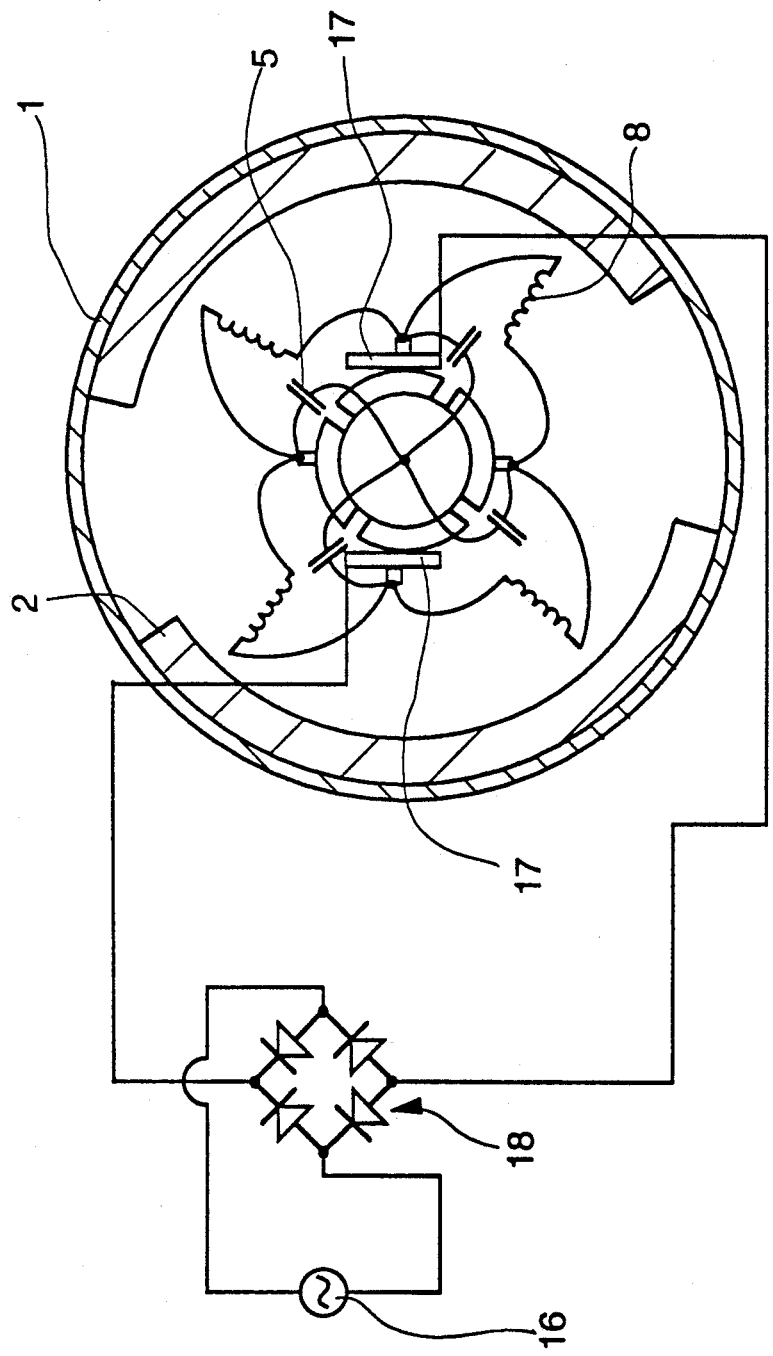
FIG. 13 is an electrical diagram similar to FIG. 12 showing arc shaped magnets.

The size of a miniature motor can be reduced by disposing the noise-suppressing capacitors 5 in slots defined by the core arms 3-1 through 3-4. FIGS. 12 and 13 show the electrical connections for the capacitors, along with the electrical connections for the windings and the capacitors to the power supply 16. In between the power supply 16 and the commutator 17 there is a rectifying circuit 18. The motor of the invention can either have a ring shaped permanent magnet surrounding the rotor, or it can have two permanent magnets, each having an arc shape. The two arced shaped permanent magnets being positioned at substantially opposite sides of the motor casing 1.

Figure 2:
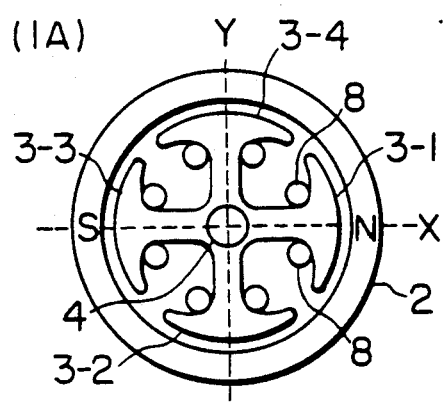
FIGS. 2 (I) and (II) are diagrams of assistance in explaining magnetic attraction force generated between the permanent magnet and the rotor core in this invention.
Figure 2:
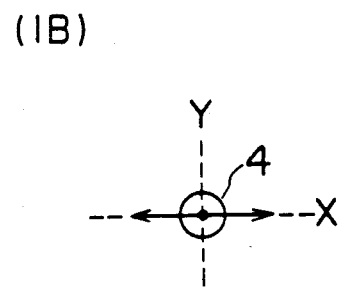
Figure 2:
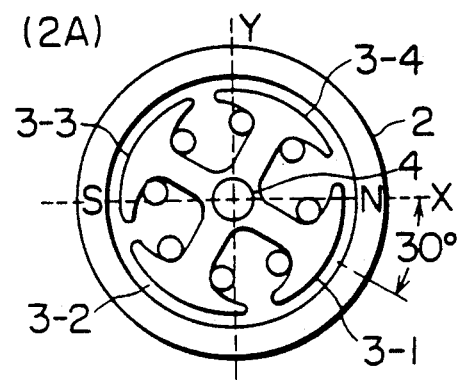
Figure 2:
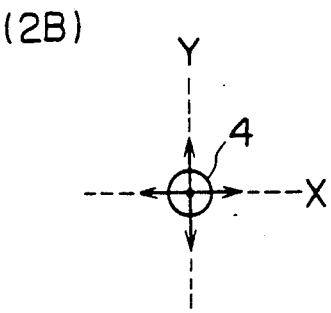
Figure 2:
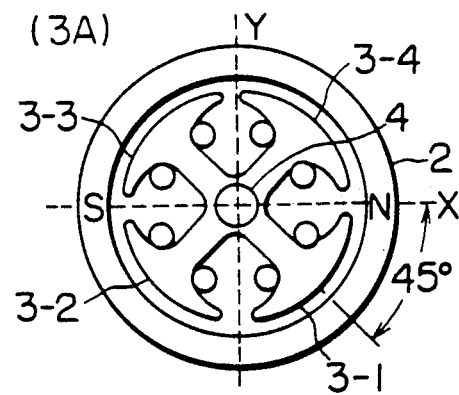
Figure 2:
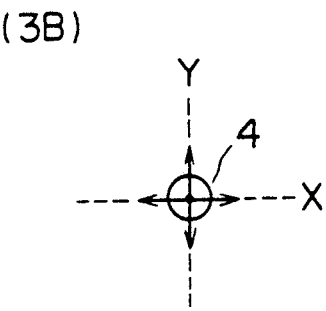
Figure 2:
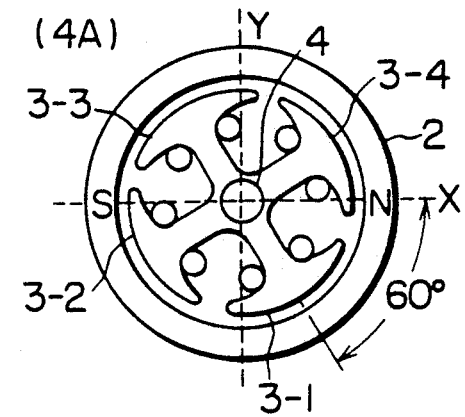
Figure 2:
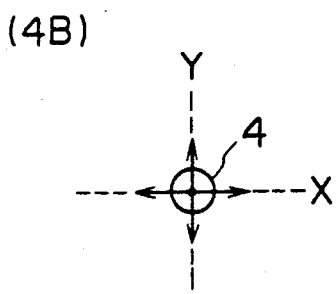

The embodiment shown in FIG. 1 is such that shaft radial forces are exerted in a point-symmetrical fashion at all angular positions, that is, throughout a full rotation of the rotor core 3, as will be described later, referring to FIGS. 2 (I) and (II), by adopting a four-pole rotor core 3 having core arms 3-1 through 3-4. By making the shaft radial forces point-symmetrical, generation of wobbling noise can be prevented. In the following, the basic principle of this invention will be described, referring to FIGS. 2 (I) and (II). FIG. 2 (I) represents the case where half-wave rectified voltage is OFF, and FIG. 2 (II) represents the case where half-wave rectified voltage is ON. In FIG. 2, a ring-shaped magnet is used as the permanent magnet 2, but a pair of arc-shaped magnets may serve the purpose.

In FIG. 2 (I), (1A) through (4A) show the states of the rotor core 3 as the rotor core 3 is turned 60 degrees, whereas (1B) through (4B) show shaft radial forces at each angular position. FIG. 2 (I) represents the . in which current is not fed to the rotor winding 8. The shaft radial forces can be considered attributable to magnetic attraction force by the permanent magnet 2 to the core arm 3-1 through 3-4, if residual magnetism in the core arms 3-1 through 3-4 is neglected. The shaft radial forces at the reference angular position shown in (1A) are shown in (1B). The shaft radial forces at the angular position shown in (2A), in which the rotor core 3 is turned 30 degrees from the reference angular position shown in (1A), are shown in (2B). The shaft radial forces at the angular position shown in (3A), in which the rotor core 3 is turned 45 degrees from the state shown in (1A), are shown in (3B). The shaft radial force at the angular position shown in (4A), in which the rotor core 3 is turned 60 degrees from the state shown in (1A), are shown in (4B). As shown in (1B) through (4B), the shaft radial forces are generated in a point-symmetrical fashion as the rotor core 3 is turned 60 degrees. In the foregoing, the shaft radial forces during the period in which the rotor core 3 is turned 60 degrees have been described. Shaft radial forces at other angular positions are the repetition of the states shown in (1B) through (4B).

(1A) through (4A) in FIG. 2 (II) show the states of the rotor core 3 during the period in which the rotor core 3 is turned 60 degrees, as in the case of FIG. 2 (I), while (1B) and (4B) show the shaft radial forces at each angular position. FIG. 2 (II) represents the case where half-wave voltage is ON, but the current is, as is well known, fed to the rotor winding 8 via the brushes and the commutator 17. Consequently, the manner in which current is fed to the rotor winding changes in accordance with the changes in angular position of the rotor core 3, as shown in (1A) through (4A) in FIG. 2 (II). Since the core arms 3-1 through 3-4 are magnetized by the current flowing the rotor winding 8, the forces exerted on the core arms 3-1 through 3-4 are the forces in the direction shown by arrows in (1A) through (4A), and the shaft radial forces exerted on the motor shaft 4 are the composition of these forces. As shown in (1B) through (4B), the shaft radial forces are generated in a point-symmetrical fashion during the period in which the rotor core 3 is turned 60 degrees. In the foregoing, the shaft radial forces during the period in which the rotor core 3 is turned 60 degrees have been described. The shaft radial forces at other angular positions are the repetition of the states shown in (1B) through (4B) above.

In the foregoing, the basic principle of this invention has been described, referring to FIGS. 2 (I) and (II). Generation of shaft radial forces in a point-symmetrical fashion is made possible by the fact that the number of core arms is even, such as four, and that the core arms 3-1 and 3-3, and the core arms 3-2 and 3-4 are point-symmetrical with each other with respect to the motor shaft 4. Although the number of core arms may be an even number other than 4, a two-pole core could not start rotation, and a core having more-than-six poles might make the construction complicated and reduce the space for noise-suppressing capacitors 5 disposed in the space between core arms, as shown in FIG. 1.

Figure 3A:
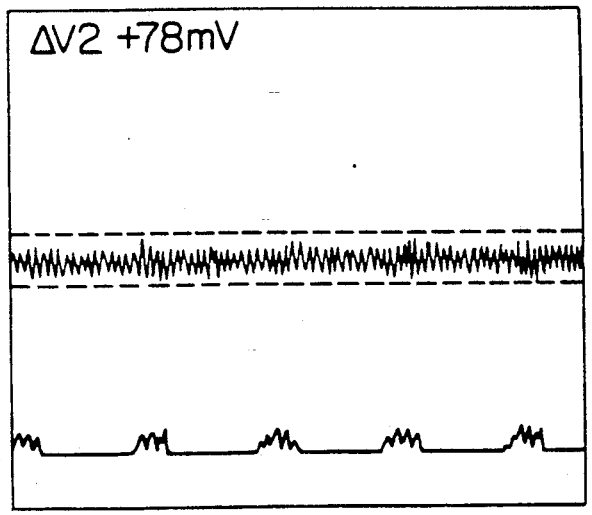
FIGS. 3 (A) and (B) are waveform diagrams representing vibration measurements in the embodiment shown in FIG. 1.
Figure 3B:
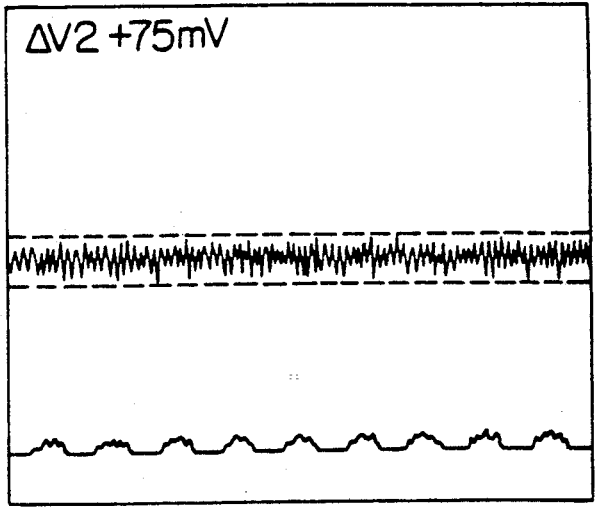
Figure 7A:
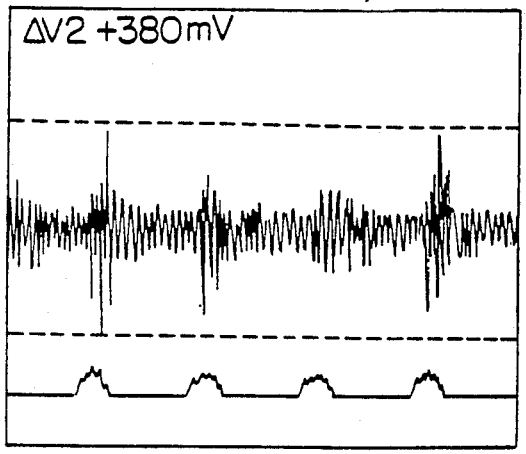
FIGS. 7 (A) and (B) are waveform diagrams representing vibration measurements on the prior-art miniature motor shown in FIG. 5.
Figure 7B:
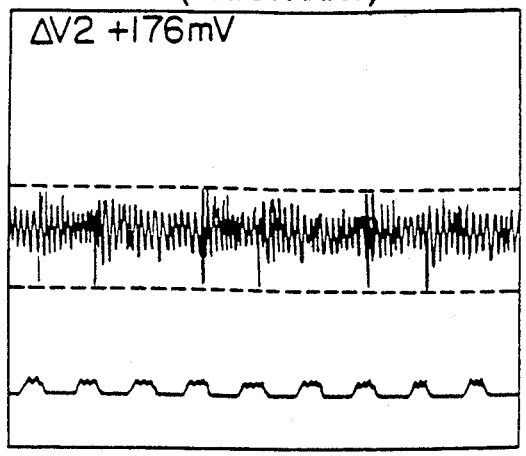
Figure 8:
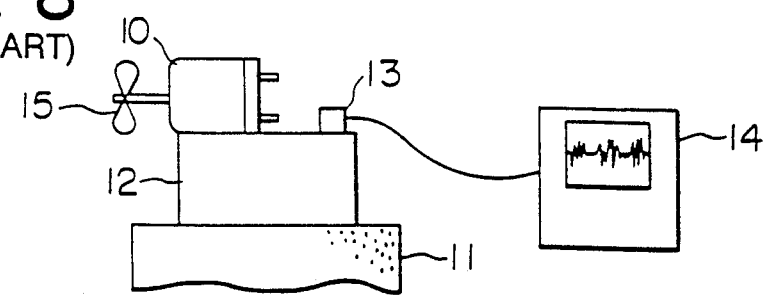
FIG. 8 is a diagram of assistance in explaining a test setup for vibration measurement tests.
Figure 9:
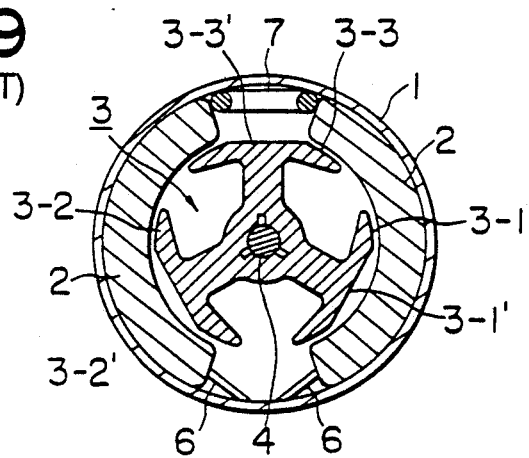
FIG. 9 is a cross-sectional view of the essential part of another prior-art miniature motor.
Figure 10A:
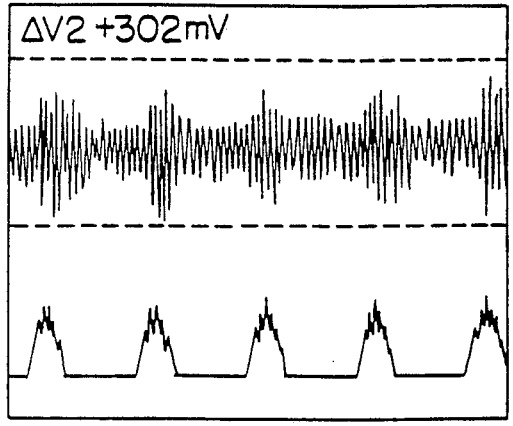
FIGS. 10 (A) and (B) are waveform diagrams representing vibration measurements on the prior-art miniature motor shown in FIG. 9.
Figure 10B:
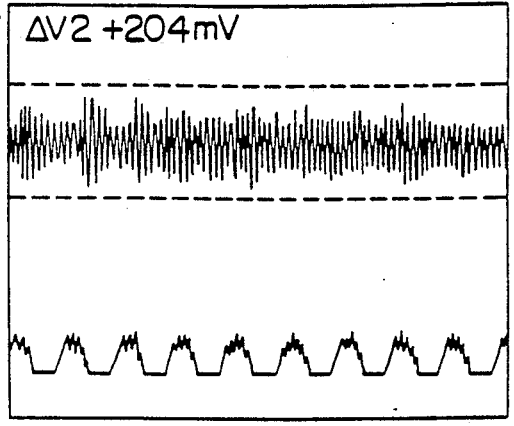
Figure 11A:
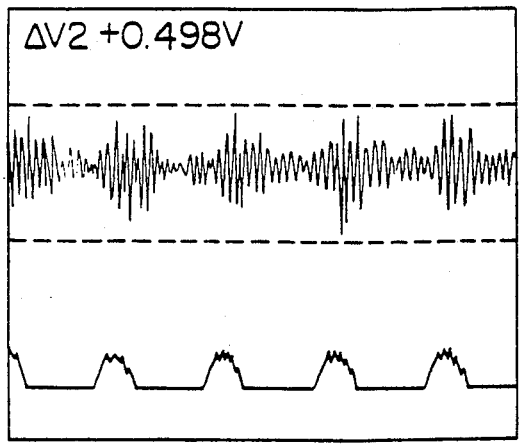
FIGS. 11 (A) and (B) are waveform diagrams representing vibration measurements obtained under phase angle control on a prior-art miniature motor.
Figure 11B:
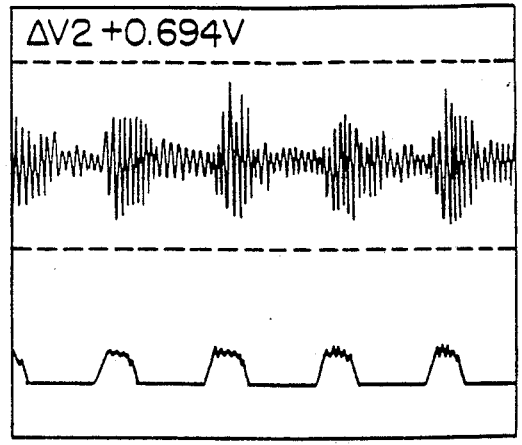

Next, the results of vibration measurement tests conducted on a miniature motor of this invention as shown in FIGS. 3 (A) and (B) will be described. FIGS. 3 (A) and (B) are photos of oscilloscope waveforms representing vibration measurements measured on a miniature motor of this invention under the same test conditions, using the test setup shown in FIG. 8, which has been described at the beginning of the present Specification. FIG. 3 (A) represents the state where source voltage was a half-wave rectified voltage, while FIG. 3 (B) represents the state where source voltage was a full-wave rectified voltage. The waveforms in the upper part of the figures are the measured vibration waveforms, and those in the lower part are the source voltage waveforms. As is apparent from FIGS. 3 (A) and (B), the generation of vibration responsible for wobbling noise is much smaller compared with the results of vibration measurements on a prior-art miniature motor (shown in FIGS. 7 (A) and (B)) in both cases of full-wave and half-wave rectified source voltages.

Figure 4:
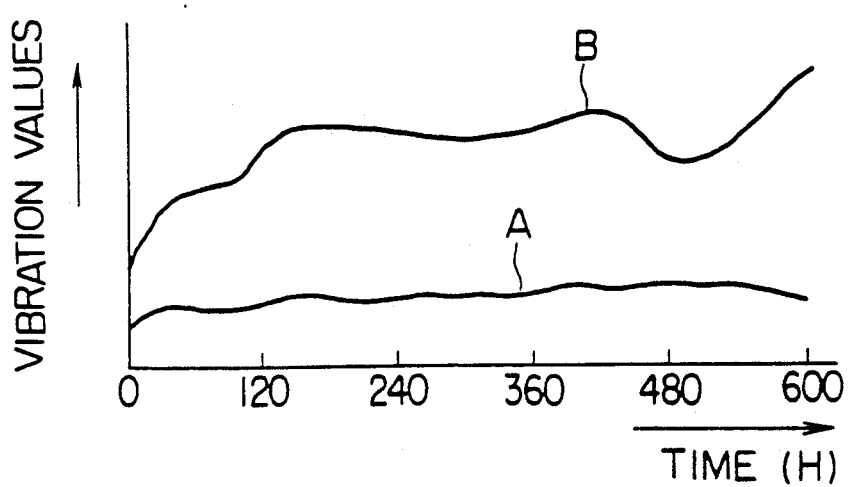
FIG. 4 is a diagram making a comparison of vibration values between a miniature motor according to this invention and a prior-art miniature motor.
Figure 5:
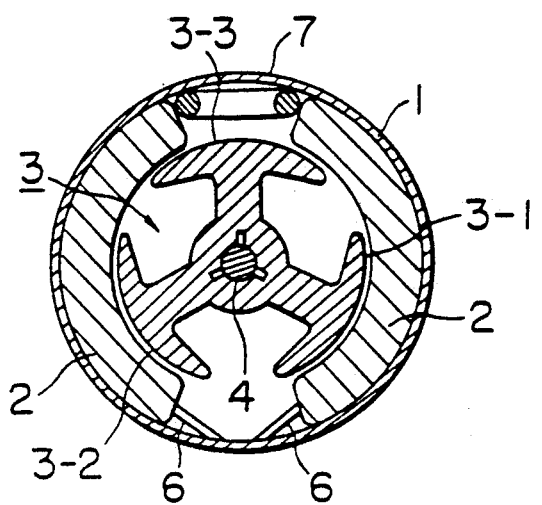
FIG. 5 is a cross-sectional view of the essential part of a prior-art miniature motor.
Figure 6:
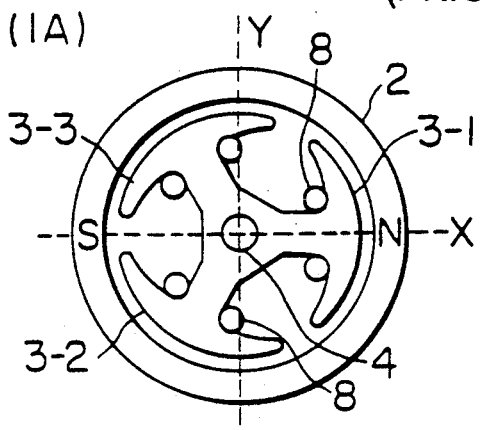
FIGS. 6 (I) and (II) are diagrams of assistance in explaining magnetic attraction force generated between the permanent magnet and the rotor core in the prior-art miniature motor shown in FIG. 5.
Figure 6:
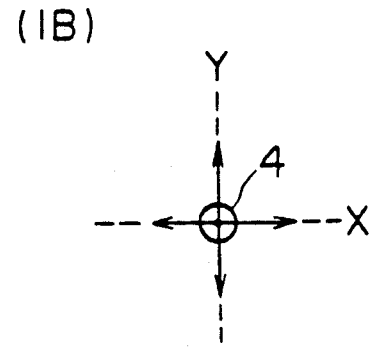
Figure 6:
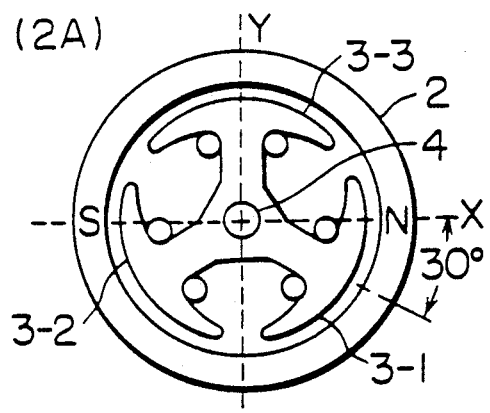
Figure 6:
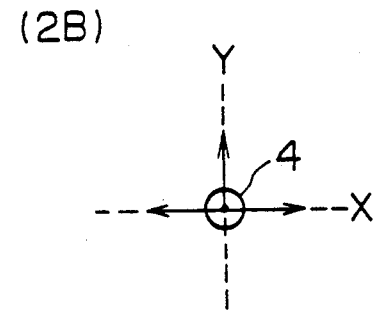
Figure 6:
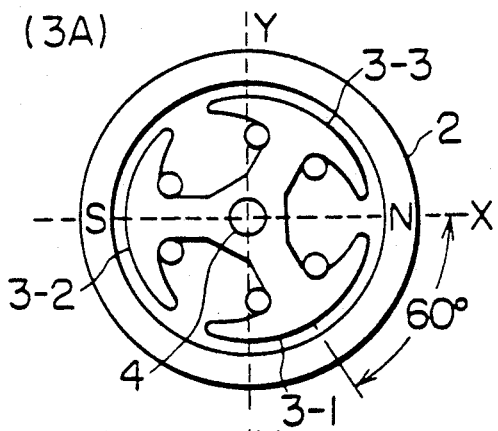
Figure 6:
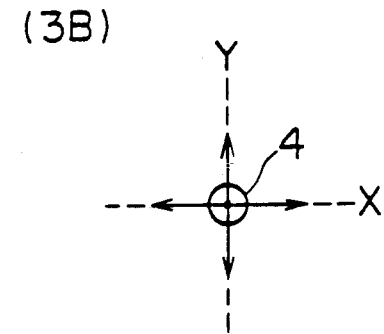
Figure 6:
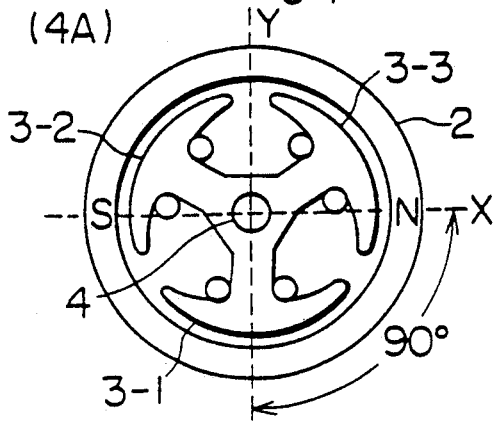
Figure 6:
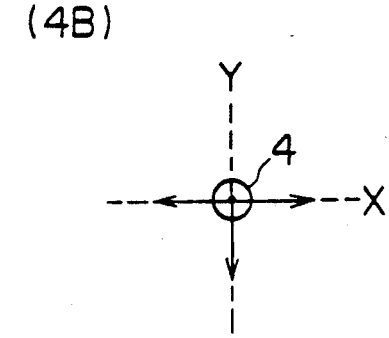

Although the oscilloscope waveforms shown in FIGS. 3 (A) and (B) are short-term data obtained during a few cycles, comparison between this invention and the prior art is based on long-term data obtained for 600 hours. In FIG. 4, Graph A shows the data for this invention, and Graph B shows the data for the prior art, with the abscissa representing elapsed time, and the ordinate vibration values. FIG. 4 indicates that the vibration value for this invention show little changes with time, whereas the vibration value for the prior art increases with time by several times as large as that for this invention after the lapse of 600 hours.

As stated above, this invention makes it possible to reduce the size of miniature motors by disposing noise-suppressing capacitors in the slots defined by the core arms of the 4-pole rotor. Furthermore, this invention makes it possible to provide a miniature motor in which the unwanted wobbling of the motor shaft during motor rotation and therefore generation of wobbling noise can be prevented by setting the number of poles of the rotor core to four to ensure the balance of magnetic attraction force generated between the permanent magnet and the rotor core over the entire circumferential surface of the rotating rotor core. The successful prevention of the wobbling of the motor shaft with this arrangement makes control of bearings easy since it is suffice to adopt oilless bearings. The oilless bearings are made of a material containing liquid or solid lubricants.

I claim:

1. A low vibration motor driven by a rectified power source, the motor comprising:
    a stator having a permanent magnet creating a substantially symmetrical two-pole magnetic field, said two-poles of said magnetic field being on substantially opposite sides of said stator;
    a rotor rotably mounted inside said stator, said rotor having four core arms positioned substantially symmetrically about said rotor, each of said four core arms having windings wound around said each of said four core arms, and forming a four-pole core on said rotor; and
    noise-suppressing capacitors positioned between said four core arms of said rotor.

2. A motor in accordance with claim 1, wherein:
    said permanent magnet has a ring shape that surrounds said rotor.

3. A motor in accordance with claim 1, wherein:
    said substantially symmetrical two-pole magnetic field is created by said permanent magnet and another permanent magnet, said permanent magnet and said another permanent magnet having an arc shape, and positioned on substantially opposite sides of said stator.

4. A motor in accordance with claim 1, wherein:
    the rectified power source generates a full-wave voltage.

5. A motor in accordance with claim 1, wherein:
    the rectified power source generates a half-wave voltage.

* * * * *